(12) United States Patent
Zhou et al.

(10) Patent No.: US 6,594,567 B2
(45) Date of Patent: Jul. 15, 2003

(54) AUTOMATIC OPENING/CLOSING DEVICE OF VEHICULAR OPENING/CLOSING BODY AND CONTROLLING METHOD

(75) Inventors: Zhenjia Zhou, Kanagawa-ken (JP); Junichi Koshikawa, Kanagawa-ken (JP)

(73) Assignee: Ohi Seisakusho Co., Ltd., Yokohama (JP)

( * ) Notice: Subject to any disclaimer, the term of this patent is extended or adjusted under 35 U.S.C. 154(b) by 0 days.

(21) Appl. No.: 10/197,748

(22) Filed: Jul. 18, 2002

(65) Prior Publication Data

US 2003/0018419 A1 Jan. 23, 2003

(30) Foreign Application Priority Data

Jul. 18, 2001 (JP) .......................................... 2001-218135

(51) Int. Cl.[7] .................................................. G06F 7/00
(52) U.S. Cl. ............................. 701/36; 701/42; 49/280; 49/360; 318/282
(58) Field of Search .............................. 701/36, 42, 45, 701/49; 49/280, 360, 214; 307/10.1; 318/282, 283

(56) References Cited

U.S. PATENT DOCUMENTS

| | | | | |
|---|---|---|---|---|
| 5,927,015 A | * | 7/1999 | Ghosn et al. | 49/291 |
| 5,979,114 A | * | 11/1999 | Clark et al. | 49/360 |
| 6,169,379 B1 | * | 1/2001 | Zhang et al. | 318/280 |
| 6,430,875 B1 | * | 8/2002 | Clark et al. | 49/360 |

* cited by examiner

Primary Examiner—Gertrude Arthur
(74) Attorney, Agent, or Firm—Kilpatrick Stockton LLP

(57) ABSTRACT

An automatic opening/closing device of a vehicular opening/closing body, which gradually increases a duty until a rotary pulse cycle is definitely decided at a stage before a jamming determining time comes, thus making it possible to move a backdoor even if a resistance due to self-weight of the backdoor is generated and to prevent a malfunction in which the backdoor is halted or an operation thereof is inverted even under a state where the backdoor does not jam any foreign object.

4 Claims, 3 Drawing Sheets

AUTOMATIC OPENING/CLOSING DEVICE OF VEHICULAR OPENING/CLOSING BODY AND CONTROLLING METHOD

BACKGROUND OF THE INVENTION

1. Field of the Invention

The present invention relates to an automatic opening/closing device of a vehicular opening/closing body, which has a function of jamming prevention.

2. Description of the Related Art

Some automobiles include opening/closing bodies such as a backdoor and a slide door, which are driven by a motor to open/close automatically (for example, refer to the gazette of Japanese Patent Laid-Open No. 2000-139095). In order to maintain an operation speed of such an opening/closing body at a specified target speed, an automatic opening/closing device of this type of the opening/closing body detects a rotary pulse of the motor by use of an encoder and the like, and then feedbacks thereto a cycle of the pulse detected by the encoder (hereinafter referred to as a rotary pulse cycle) to increase/decrease a duty (output) of the motor. Namely, when the opening/closing body lowers its operation speed below the target speed to elongate the rotary pulse cycle, the automatic opening/closing device increases the duty to enhance the operation speed of the opening/closing body. On the contrary, when the operation speed of the opening/closing body is raised more than the target speed to shorten the rotary pulse cycle, the automatic opening/closing device decreases the duty to lower the operation speed of the opening/closing body.

In the control as described above, when some foreign objects are jammed in the opening/closing body during a closing operation thereof, the opening/closing body lowers its operation speed below the target speed, and the rotary pulse cycle is also elongated more than a standard pulse time. Then, when the rotary pulse cycle longer than the standard pulse time reaches a preset jamming determining time, the automatic opening/closing device determines the above-described state as "jamming," and halts the closing operation by the motor, or alternatively, inverts the closing operation to an opening operation, and thus prevents breakage of the opening/closing body.

SUMMARY OF THE INVENTION

In such related jamming determining control, as described above, when the rotary pulse cycle of the motor is elongated to a specified jamming determining time, the automatic opening/closing device determines the above-described state as a state where a foreign object is jammed in the opening/closing body, and halts the closing operation of the opening/closing body, or alternatively, inverts the closing operation to the opening operation. However, depending on the conditions of the vehicle, in some cases, a similar state to the jamming occurs though the foreign object is not jammed in the opening/closing body, and a jamming prevention mechanism malfunctions.

For example, with regard to a backdoor driven by the motor to open/close automatically, when the vehicle is parked halfway on a slope in an inclined state where the front of the vehicle faces upward, in the case of closing the backdoor electrically, a resistance due to self-weight of the backdoor is applied thereto more than when the vehicle is parked in a horizontal state. Therefore, the backdoor becomes harder to close as compared with the closing operation on the level ground, the rotary pulse cycle of the motor is elongated similarly to the case of jamming the foreign object, and the automatic opening/closing device mistakenly recognizes such a state as a jamming state in some cases.

The present invention was made paying attention to the related art as described above. The present invention provides an automatic opening/closing device of a vehicular opening/closing body, which is capable of preventing mistaken recognition of the above-described state as a jamming state.

A first aspect of the present invention is an automatic opening/closing device of a vehicular opening/closing body, including: a motor driven to open/close the opening/closing body, the motor halting a closing operation of the opening/closing body or inverting the closing operation to an opening operation when it is decided that the foreign object is jammed; and a controller for performing feedback control for a rotary pulse cycle of the motor to increase/decrease a duty in order to open/close the opening/closing body at a target speed and for determining, as jamming, a state where the rotary pulse cycle is not definitely decided before a jamming determining time comes, the jamming determining time being lowered much more than a standard pulse time corresponding to a target speed, wherein the duty is increased step by step until the rotary pulse cycle is definitely decided at a stage before the jamming determining time comes.

According to the first aspect, the duty is gradually increased until the rotary pulse cycle is definitely decided at the stage before the jamming determining time comes. Therefore, like slope parking, even in a "pseudo jamming situation," where a certain state is mistakenly recognized, as a jamming state even though a foreign object is not actually jammed in the state, the duty is gradually increased, and thus the opening/closing body starts to move before the jamming determining time comes, and the rotary pulse cycle is definitely decided.

Accordingly, the "pseudo jamming situation" can be detected, and thus it is made possible to prevent a malfunction, in which the opening/closing body is halted or the operation thereof is inverted under the situation that is not the jamming state. Moreover, since the duty is gradually increased, the duty is not increased greatly once, and a load in the case of actually jamming a foreign object does not become excessive, resulting in safety.

Moreover, in a second aspect of the present invention, as timing of gradually increasing the duty, a pulse lowering determining time is provided, which is sufficiently longer than the standard pulse time and shorter than the jamming determining time, and after the pulse lowering determining time elapses, the duty is increased step by step for each specified duty increasing interval.

According to the second aspect, the timing of gradually increasing the duty is set after the elapse of the pulse lowering determining time longer than the standard pulse time, that is, the timing is delayed, and therefore, the duty can be increased securely after the standard pulse time elapses, and the increase of the duty becomes hard to be excessive for the amount of the delay.

Furthermore, in a third aspect of the present invention, when the rotary pulse cycle is definitely decided at the stage before the jamming determining time comes, the duty is not increased by the feedback control.

According to the third aspect, when the rotary pulse cycle is definitely decided at the state before the jamming determining time comes by gradually increasing the duty in the above-described aspects, that is, when the motor starts to move again with a fixed number of revolutions, if a long rotary pulse cycle in this case is to be subjected to the feedback control as it is, then, in order to recover the significant lowering of the operation speed, the motor rotates rapidly to close the opening/closing body rapidly. As a countermeasure therefor, the rotary pulse cycle is not to be subjected to the feedback control in this case, and the duty is maintained as it is, and thus the rapid rotation of the motor is prevented.

DESCRIPTION OF THE PREFERRED EMBODIMENT

Figure 1:
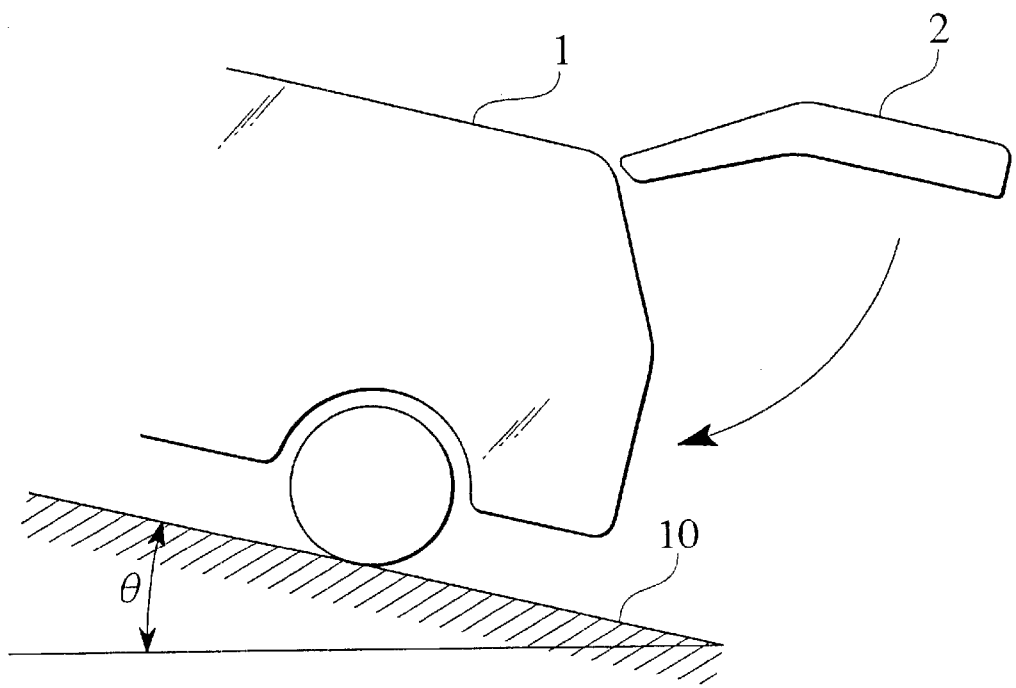
FIG. 1 is a side view showing an example where an automatic opening/closing device according to the present invention is applied to an automotive backdoor.
Figure 2:
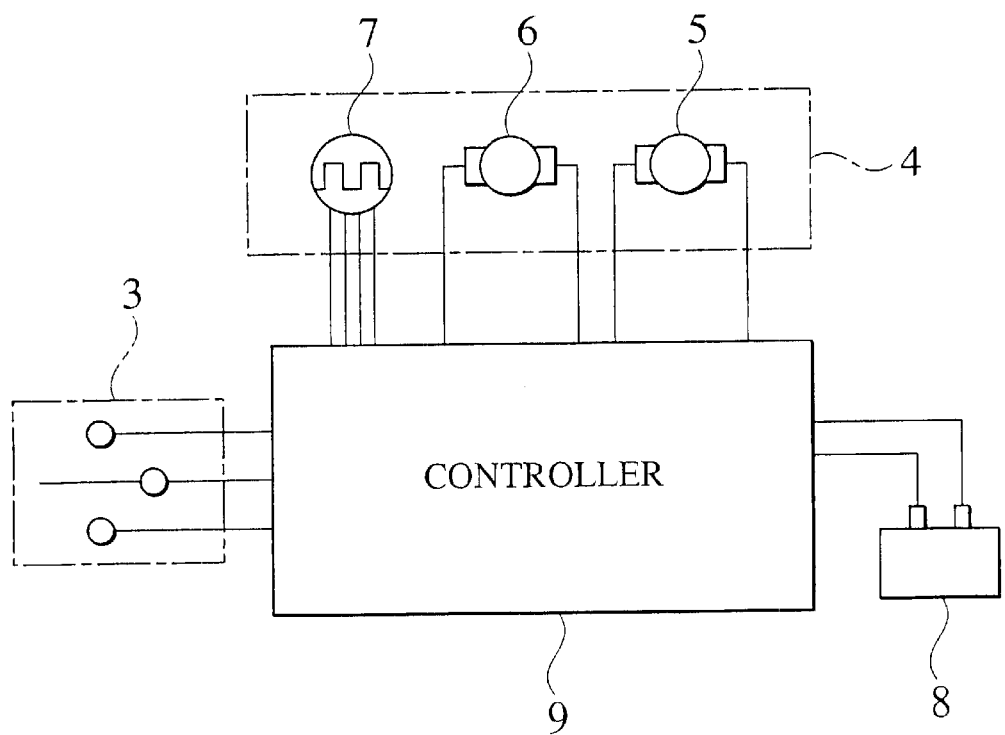
FIG. 2 is a block diagram showing an opening/closing control device of the backdoor.

Hereinafter, description will be made for a preferred embodiment of the present invention with reference to FIGS. 1 to 4. This embodiment is applied to a backdoor 2 as an "opening/closing body" provided at the rear of a vehicle 1. A drive mechanism 4 operates by manipulating a switch 3, thus making it possible to open/close the backdoor 2 automatically. The drive mechanism 4 is composed of a motor 5, a clutch 6 and a rotary encoder 7. The motor 5 generates drive force for opening/closing the backdoor 2. The clutch 6 transmits the drive force of the motor 5 to the backdoor 2 and disconnects the transmission of the drive force thereto. The release of the clutch 6 enables manual manipulation of the backdoor 2. The rotary encoder 7 detects rotary pulses of the motor 5.

The drive mechanism 4 is connected to a controller 9. Moreover, the controller 9 is connected to the switch 3 and a power supply 8. Based on signals from the rotary encoder 7 and the switch 3, the controller 9 controls outputs to the motor 5 and the clutch 6. Particularly, inside the controller 9, there are provided a CPU, a drive circuit for a motor, and the like (not shown in the FIGS.), which calculate a rotary pulse cycle (opening/closing speed) of the backdoor 2 by a pulse cycle counter P detecting a width (time) of the rotary pulse based on the rotary pulse from the rotary encoder 7, and perform duty control for matching the rotary pulse cycle (opening/closing speed) with a preset target speed.

By the control of the controller 9, when the operation speed of the backdoor 2 is lowered more than the target speed and the rotary pulse cycle is elongated, the duty is increased to enhance the operation speed of the backdoor 2. On the contrary, when the operation speed of the backdoor 2 is raised more than the target speed and the rotary pulse cycle is shortened, the duty is decreased to lower the operation speed of the backdoor 2.

Moreover, when some foreign objects are jammed in the backdoor 2, the operation speed of the backdoor 2 is lowered much more than the target speed, and the rotary pulse cycle is also elongated more than the standard pulse time. Therefore, when the rotary pulse cycle longer than the standard pulse time reaches a preset specified jamming determining time, the automatic opening/closing device determines the above-described state as "jamming," and halts the closing operation by the motor, or alternatively, inverts the closing operation to an opening operation, and thus prevents breakage of the backdoor 2.

Figure 3:
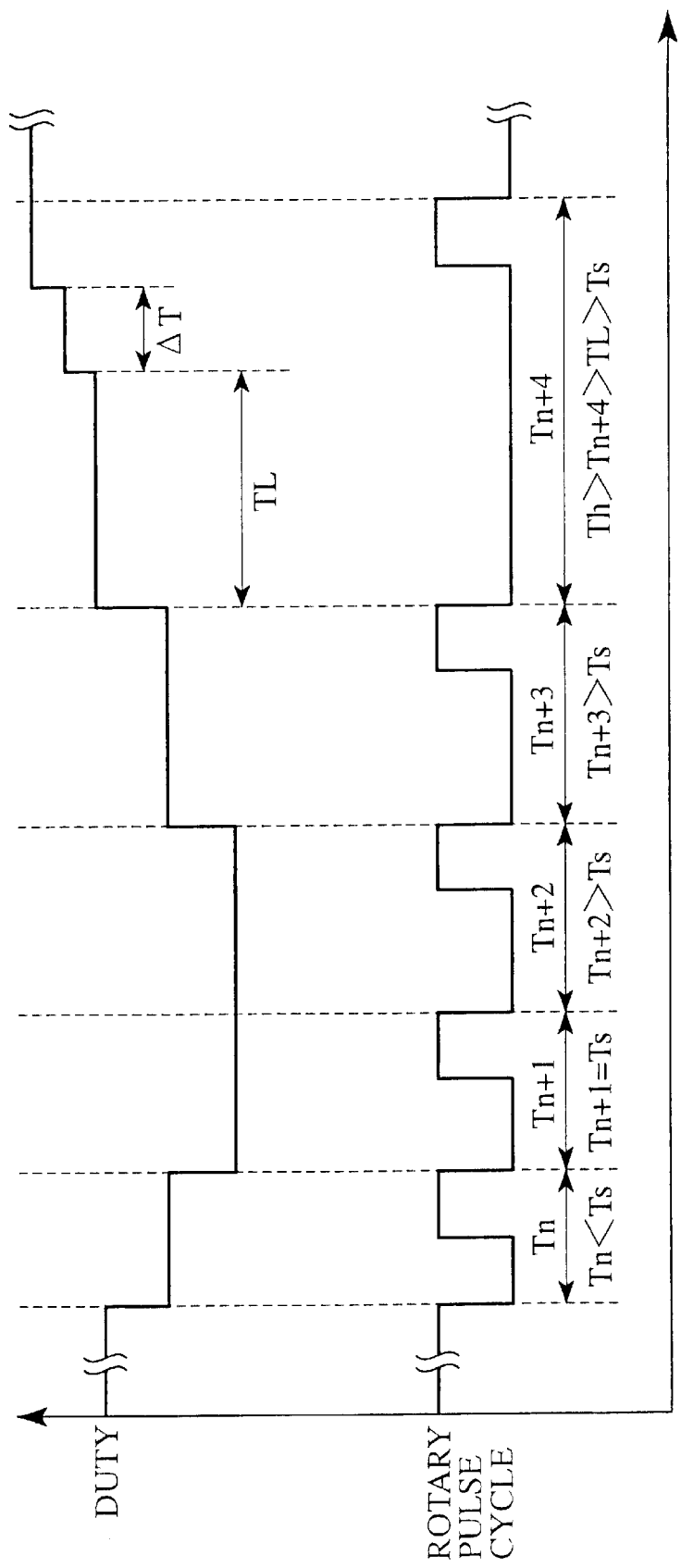
FIG. 3 is a graph showing a relationship between a rotary pulse cycle and a duty.

FIG. 3 is a graph showing actual duty control and jamming determination. This graph shows a state when the backdoor 2 is closed. Hereinafter, description will be made for a situation where a rotary pulse cycle Tn is changed in time series to Tn+1, Tn+2, Tn+3 and Tn+4. First, in the case of the rotary pulse cycle Tn, since the rotary pulse cycle Tn is smaller than a standard pulse time Ts corresponding to the target speed (Tn<Ts), the operation speed of the backdoor 2 is faster than the target speed. Accordingly, in the next rotary pulse cycle Tn+1, the duty is lowered by the feedback control. Since the duty has been lowered, the rotary pulse cycle Tn+1 becomes equal to the standard pulse time Ts (Tn+1=Ts), and in the next rotary pulse cycle Tn+2, no change occurs in the duty.

However, since the rotary pulse cycle Tn+2 has become larger than the standard pulse time Ts (Tn+2>Ts), in the next rotary pulse cycle Tn+3, the duty is raised by the feedback control. Even if the duty is raised, since the rotary pulse cycle Tn+3 is still larger than the standard pulse time Ts (Tn+3>Ts), the duty is further raised by the feedback control also in the next rotary pulse cycle Tn+4.

This rotary pulse cycle Tn+4 is sufficiently longer than the standard pulse time Ts, of which length is likely to reach a jamming determining time Th judged as the time of "jamming," when the foreign object is jammed in the backdoor 2. With regard to the case where the rotary pulse cycle Tn+4 is elongated as described above, there are two cases: first, the case where the foreign object is actually jammed; and second, as shown in FIG. 1, the case where the vehicle 1 is parked halfway on an ascending slope 10 and inclined at an angle θ, and the self-weight of the backdoor 2 is added thereto to bring a situation where the backdoor 2 is harder to close than the case where the vehicle is parked in a horizontal state (pseudo jamming situation).

In this embodiment, the rotary pulse cycle is not left as it is until it reaches a jamming determining time Th, but the duty is gradually increased approximately by 2% for each specified duty increasing interval ΔT after the elapse of a pulse lowering determining time TL sufficiently longer than the standard pulse time Ts and shorter than the jamming determining time Th. Accordingly, if the situation is of the pseudo jamming, then, before the jamming determining time Th comes, the backdoor 2 starts to move, and the rotary pulse cycle Tn+4 is definitely decided. Accordingly, the pseudo jamming situation can be detected, and the malfunction can be prevented, in which the backdoor 2 is halted, or alternatively, the operation thereof is inverted under the situation that is not the jamming state. Moreover, since the duty is gradually increased, also in the case where the foreign object is actually jammed and the jamming determining time Th comes, the load during the jamming does not become excessive, resulting in safety.

Furthermore, the case is conceived, where, like the rotary pulse cycle Tn+4, the duty is gradually increased by the feedback control, and thus the rotary pulse cycle is definitely decided before the jamming determining time Th comes. In this case, if the long rotary pulse cycle is to be subjected to the feedback control as it is, then, in order to recover the significant lowering of the operation speed, the motor 5 rotates rapidly to close the opening/closing body rapidly. Accordingly, as a countermeasure for the above-described state, in such a case, the rotary pulse cycle obtained by gradually increasing the duty is not to be subjected to the feedback control, and the duty is maintained as it is, and thus the rapid rotation of the motor 5 is prevented.

Figure 4:
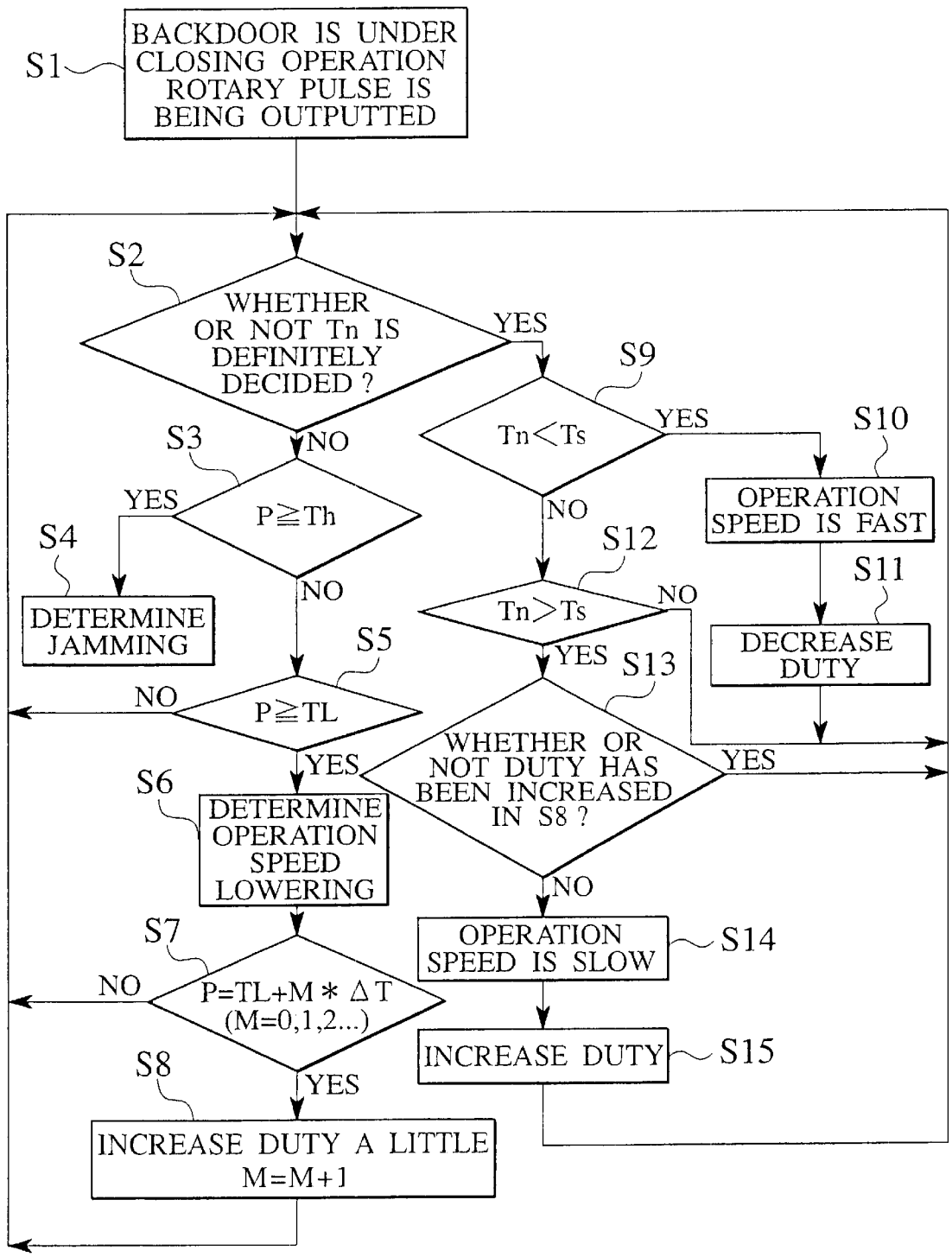
FIG. 4 is a flowchart showing duty control.

Description will be made for a function for maintaining the next duty to that of the rotary pulse cycle Tn+4 as it is based on a control flowchart of FIG. 4, the function including the above-described duty control.

In Step S1, the backdoor 2 is under closing operation, and rotary pulses are outputted from the motor 5. When a rotary pulse cycle Tn is not definitely decided in Step S2, the rotary pulse cycle that is not definitely decided is measured by the pulse cycle counter P in Step S3. As a result of the measurement, if the rotary pulse cycle is equal to/more than the jamming determining time Th, determination as the jamming is made in Step S4. On the contrary, if the rotary pulse cycle is less than the jamming determining time Th, then the control proceeds to Step S5. In Step S5, judgment is made as to whether or not the previously measured value is equal to/more than the pulse lowering determining time TL. When the measured value is less than the specified pulse lowering determining time TL, the control returns to Step S2. On the contrary, when the measured value is equal to/more than the specified pulse lowering determining time TL, determination as an operation speed lowering state is made in Step S6, and the control proceeds to the next Step S7. In the next Step S7, based on the value measured by the pulse cycle counter P, determination is made as to bow many times a duty increasing interval ΔT has been increased after the pulse lowering determining time TL. Here, when the increased number of ΔT is defined as M, M becomes equal to 0 and P becomes equal to TL at the first determination (state where the duty starts to be increased in the interval ΔT. Here, the rotary pulse cycle measured by the pulse cycle counter P and the pulse lowering determining time TL coincide with each other, and therefore, the control proceeds to Step S8. In Step S8, the duty is increased approximately by 2%, and based on the equation: M=M+1, the ΔT increased number M becomes as: M=0+1, which is rounded up by one digit to: M=1. Thereafter, the control returns to Step S2 again. Thereafter, when the control reaches Step S7 again, an equation is established as follows: P<TL+1*ΔT. For example, when the duty is constant, and the control is operated in the duty increasing interval ΔT, the operation returns to Step S2, and the operation from Step S2 to Step S7 is iterated until the equation: P=TL+1*ΔT is satisfied. When the value of the pulse cycle counter P coincides with TL+1*ΔT, and thus the equation: P=TL+1*ΔT is satisfied in Step S7, the control proceeds to Step S8, where the duty is increased approximately by 2% again. Then, the control returns to Step S2 again.

Subsequently, when the backdoor 2 starts to move by increasing the duty step by step by the method as described above, and thus the rotary pulse cycle Tn is definitely decided, the control proceeds from Step S2 to Step S9. In Step S9, judgment is made as to whether or not the rotary pulse cycle Tn is less than the standard pulse time Ts. When the rotary pulse time Tn is less than the standard pulse time Ts, judgment is made that the operation speed of the backdoor 2 is fast in Step S10, and the control proceeds to the subsequent Step S11. In Step S11, the duty is decreased, and the control returns to Step S2.

On the contrary, when the rotary pulse cycle Tn is more than the standard pulse time Ts in Step S9, the control proceeds to the next Step S12. In Step S12, judgment is made as to whether or not the rotary pulse cycle Tn is larger than the standard pulse time Ts.

In Step S12, when the rotary pulse cycle Tn is judged not to be larger than the standard pulse time Ts, this implies that the rotary pulse cycle Tn is equal to the standard pulse time Ts. Therefore, the control returns to Step S2 without doing anything.

When the rotary pulse cycle Tn is judged to be larger than the standard pulse time Ts, this implies that the operation speed of the backdoor 2 is slow. However, immediate judgment is not made in Step S14 that the operation speed is slow, or then the duty is not increased in the next Step S15. But before Step S14, judgment is made in Step S13 as to whether or not the duty has been increased little by little in Step S8 in the process thereto. When judgment is made in Step S13 that the duty has been increased little by little in Step 8, the duty is not increased, and the control returns to Step S2. Accordingly, the rotary pulse cycle Tn in this part is not to be subjected to the feedback control, and thus the rapid rotation of the motor 5 (rapid closing of the backdoor 2) is prevented. On the contrary, when judgment is made that the duty has not been increased in Step 8, the control proceeds to Step S14, where the operation speed is judged to be slow. Thereafter, the control proceeds to Step S15, where the duty is increased. Then, the control returns to Step S2.

Note that, in the above-described embodiment, though the backdoor 2 is exemplified as the "opening/closing body," the present invention is not limited to the backdoor 2, and it is possible to apply the present invention also to other opening/closing bodies such as a slide door.

What is claimed is:

1. An automatic opening/closing device of a vehicular opening/closing body, comprising:

a motor driven to open/close the opening/closing body, the motor halting a closing operation of the opening/closing body or inverting the closing operation to an opening operation when it is decided that a foreign object is jammed; and a controller for performing feedback control for a rotary pulse cycle of the motor to increase/decrease a duty in order to open/close the opening/closing body at a target speed and for determining, as jamming, a state where the rotary pulse cycle is not definitely decided before a jamming determining time comes, the jamming determining time being lowered much more than a standard pulse time corresponding to a target speed, wherein the duty is increased step by step until the rotary pulse cycle is definitely decided at a stage before the jamming determining time comes.

2. The automatic opening/closing device of a vehicular opening/closing body according to claim 1, wherein, as timing of gradually increasing the duty, a pulse lowering determining time is provided, the pulse lowering determining time being sufficiently longer than the standard pulse time and shorter than the jamming determining time, and after the pulse lowering determining time elapses, the duty is increased step by step for each specified duty increasing interval.

3. The automatic opening/closing device of a vehicular opening/closing body according to claim 1, wherein, when the rotary pulse cycle is definitely decided at the stage before the jamming determining time comes, the duty is not increased by the feedback control.

4. A controlling method for a closing operation of a vehicular opening/closing body, the closing operation being performed by an automatic opening/closing device provided with a motor for driving the opening/closing body, the controlling method comprising:

detecting a rotary pulse cycle from the motor;

judging whether the rotary pulse cycle is definitely decided;

comparing the rotary pulse cycle with a specified jamming determining time when the rotary pulse cycle is not definitely decided;

comparing a specified pulse lowering determining time with the rotary pulse cycle when the rotary pulse cycle is less than the jamming determining time; and increasing a duty step by step until the rotary pulse cycle is definitely decided when the rotary pulse cycle is less than the pulse lowering determining time.

* * * * *